United States Patent
Kanematsu et al.

(10) Patent No.: US 8,202,469 B2
(45) Date of Patent: Jun. 19, 2012

(54) METHOD OF MANUFACTURING HOLLOW STRUCTURAL MEMBER, SUBSTRATE FOR HOLLOW STRUCTURAL MEMBER PRODUCTION, AND APPARATUS FOR MANUFACTURING HOLLOW STRUCTURAL MEMBER

(75) Inventors: Toshihiro Kanematsu, Atsugi (JP); Shin-ya Seno, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 2 days.

(21) Appl. No.: 12/920,554

(22) PCT Filed: Mar. 10, 2009

(86) PCT No.: PCT/JP2009/054985
§ 371 (c)(1),
(2), (4) Date: Sep. 1, 2010

(87) PCT Pub. No.: WO2009/113705
PCT Pub. Date: Sep. 17, 2009

(65) Prior Publication Data
US 2011/0001277 A1    Jan. 6, 2011

(30) Foreign Application Priority Data
Mar. 10, 2008 (JP) ................................. 2008-059170

(51) Int. Cl.
*B29C 49/00* (2006.01)
(52) U.S. Cl. ........................................ 264/570; 264/544
(58) Field of Classification Search .................. None
See application file for complete search history.

(56) References Cited

U.S. PATENT DOCUMENTS

| 3,765,810 A | 10/1973 | Smarook |
| 2004/0037530 A1* | 2/2004 | Ohtsu et al. .................... 385/129 |
| 2008/0220204 A1 | 9/2008 | Ohgaki et al. |
| 2009/0133804 A1 | 5/2009 | Kanematsu et al. |

FOREIGN PATENT DOCUMENTS

| CN | 101258013 | 9/2008 |
| DE | 2263704 | 8/1973 |
| EP | 1922198 | 5/2008 |

(Continued)

OTHER PUBLICATIONS

International Search Report in connection with PCT/JP2009/054985, 2009.

*Primary Examiner* — Monica A Huson
(74) *Attorney, Agent, or Firm* — Cooper & Dunham LLP

(57) ABSTRACT

There is provided a method of manufacturing a hollow structural member suitable for precisely manufacturing a hollow structural member whose pitch space of the hollows is below 30 μm. The method of manufacturing a hollow structural member of this invention is to encapsulate, by using a gas-permeable material in part of a material that constitutes the substrate (5) for manufacturing the hollow structural member, a high-pressure gas by injection in advance, under high-pressure conditions, into the gas-permeable material; to form a plastic deformation film (10) on a surface under reduced-pressure conditions; and to expand and draw the plastic deformation film (10), while preventing the plastic deformation material from entering the recesses (5b), by discharging the high-pressure gas that is encapsulated in the gas-permeable material into each of the recesses (5b), whereby the hollow structural member is manufactured.

10 Claims, 7 Drawing Sheets

FOREIGN PATENT DOCUMENTS

| | | |
|---|---|---|
| FR | 2166130 | 8/1973 |
| JP | 48-78282 | 10/1973 |
| JP | 2001-315217 | 11/2001 |
| JP | 2004-331793 | 11/2004 |
| JP | 2007-98930 | 4/2007 |
| JP | 2007-148046 | 6/2007 |
| JP | 2008-183759 | 8/2008 |
| KR | 10-2008-0033532 | 4/2008 |
| WO | WO2007/029864 | 3/2007 |
| WO | WO2008/093543 | 8/2007 |

\* cited by examiner

METHOD OF MANUFACTURING HOLLOW STRUCTURAL MEMBER, SUBSTRATE FOR HOLLOW STRUCTURAL MEMBER PRODUCTION, AND APPARATUS FOR MANUFACTURING HOLLOW STRUCTURAL MEMBER

CROSS-REFERENCE TO THE RELATED APPLICATIONS

This application is based on and claims priority from Japanese Patent Application No. 2008-059170, filed on Mar. 10, 2008, the disclosure of which is incorporated herein by reference in its entirety.

TECHNICAL FIELD

The invention relates to a method of manufacturing a hollow structural member of honeycomb structure, and the like, to a substrate for hollow structural member production, and to an apparatus for manufacturing a hollow structural member. The invention is applicable to the manufacturing of a flare element of an optical element having anisotropy, a separator for a fuel cell, a filter, and the like. By injecting functional materials into hollows of a hollow structural member, the invention is also applicable to an anisotropic functional member, e.g., a flare microlens array, an anisotropic conductive film, and a substrate for cell culture for use in regenerative medicine.

BACKGROUND ART

As shown in FIG. 1, there is conventionally known a method of manufacturing a hollow structural member in which: a temperature control apparatus 23 is provided inside a hermetically sealed vessel 22 on an upper part of a material coating apparatus 21; a substrate 24 for production of a hollow structural member in which a multiplicity of recesses 24a are arrayed on its surface is set in position on the temperature control apparatus 23; a plastic deformation material for forming therewith a hollow structural member as a honeycomb structure is caused to be ejected from a material ejection apparatus 25 toward the surface of the substrate 24 for production of a hollow structural member; the material coating apparatus 21 is rotated to thereby form, on the surface of the substrate 24 for production of a hollow structural member, a substantially uniform plastic deformation film 26; the gas pressure inside the hermetically sealed vessel 22 is reduced; and the plastic deformation film 26 is thus caused to be expanded and drawn by the pressure of the gas stored in each of the recesses, to thereby manufacture a hollow structural member having a multiplicity of hollows (see, e.g., patent document 1).

The term honeycomb structure means in the invention not only the one having hexagonal shape of holes but also includes the ones having square and pentagonal holes and refers, irrespective of the shape, to the sheet-like members as a whole having a plurality of hollows.

(Patent document 1) JP-A-2007-98930 (page 15, FIG. 7, FIG. 8)

In Patent Document 1, there was obtained a hollow structural member in which the pitch distance between the center of a hollow to the center of another hollow is 35 µm. In case the pitch distance between the center of a hollow to the center of another hollow becomes 30 µm or below, it is difficult to manufacture a hollow structural member in this manufacturing method. The reasons are explained hereinbelow.

Let the point of time at which the plastic deformation film 26 was formed on the surface of the substrate 24 for production of a hollow structural member be $t=t_0$ (see FIG. 2). After a lapse of time $t=t_1$, there will disappear the gas storing space that is defined by the recess 24a and that has the gas pressure $P_1$ (see FIG. 3). As a result, the gas can no longer be expanded at the gas pressure $P_0$ under the reduced pressure conditions.

According to the Yung-Laplace's equation, the pressure of a bubble is generally proportional to the surface tension of the substance enclosing the bubble and is inversely proportional to the radius of the bubble. For example, in case of a bubble in the water, when the diameter is 100 µm, the pressure difference between the pressure of the bubble and the external pressure is about 3 kPa. Here, if the diameter is made smaller to 10 µm, the pressure difference between the pressure of the bubble and the external pressure will become about 30 kPa. If the pressure of the bubble becomes higher, the solubility of the gas into the water increases, with the result that the gas will be molten into the water. Then, the size of the bubble becomes smaller and, as a result, the pressure becomes still higher and the gas will be dissolved into the water. The smaller becomes the size of the bubble, the higher becomes the speed acceleratingly, thereby finally resulting in disappearance of the bubble.

It is considered that the same kind of phenomenon is taking place with the plastic deformation film 26. In this case, if the pitch distance becomes smaller, the pressure in the gas storing space increases due to the surface tension of the plastic deformation film. In case the gas inside the gas storing space is plastic material that forms the plastic deformation film 26, or in case the substrate 24 for production of a hollow structural member is a gas-permeable material, they will be dissolved into the gas-permeable material, and the gas is discharged to the atmosphere at a low pressure $P_0$. Finally, the gas storing space will entirely be filled with the plastic deformation material after a lapse of time.

As a result, there is a disadvantage in that the hollow structural member having the pitch distance of the hollows of 30 µm or below cannot precisely be formed.

SUMMARY

In an aspect of this disclosure, there is provided a method of manufacturing a hollow structural member which is suitable for precisely manufacturing a hollow structural member with the pitch distance of the hollows of 30 µm or below, a substrate for hollow structural member production, and an apparatus for manufacturing a hollow structural member.

In another aspect, there is provided a method of manufacturing a hollow structural member, by using a substrate for hollow structural member production, in which the substrate has: a surface on which a plastic deformation film is formed using a plastic deformation material; and a plurality of recesses which open toward the surface and which store therein a gas for forming a plurality of hollows by expanding and drawing the plastic deformation film through discharging of the gas, characterized in: that, by using a gas-permeable material in part of a material that constitutes the substrate for hollow structural member production, a high-pressure gas is encapsulated by injection in advance, under high-pressure conditions, into the gas-permeable material; that the plastic deformation film is formed on the surface under reduced-pressure conditions; and that, while preventing the plastic deformation material from entering the recesses, the high-pressure gas that is encapsulated in the gas-permeable material is discharged into each of the recesses so that the plastic deformation film is expanded and drawn by the high-pressure gas into each of the recesses, whereby the hollow structural member is manufactured.

The method of manufacturing a hollow structural member can have a feature in that the high-pressure gas is injected into the gas-permeable material from a place other than the surface.

The method of manufacturing a hollow structural member can have a feature in that the pressure difference ΔP between the gas pressure of the high-pressure gas and the gas pressure under reduced-pressure conditions satisfies the following conditional expression:

$$(2 \times \sigma/r) < \Delta P < 2 \times \sigma_b \cdot L/r$$

where σ is a surface tension of the plastic deformation material, r is an average radius of each of the recesses, $\sigma_b$ is a tension strength of the plastic deformable material, and L is the distances among the recesses.

The method of manufacturing a hollow structural member can have a feature in that the high-pressure gas is injected into the gas-permeable material from a rear-surface side which is opposite to the above-described surface.

The method of manufacturing a hollow structural member can have a feature in that the gas-permeable material consists essentially of a high polymer material.

The method of manufacturing a hollow structural member can have a feature in that the high polymer material is dimethylpolysiloxane.

A substrate for hollow structural member production can be a substrate for hollow structural member production using a plastic deformation material, in which the substrate has: a surface on which a plastic deformation film is formed using a plastic deformation material; and a plurality of recesses which open toward the surface and which store therein a gas for forming a plurality of hollows by expanding and drawing the plastic deformation film through discharging of the gas, characterized in that the substrate has: an inorganic material for constituting: a front surface in which a plastic deformation film is formed by using a plastic deformation material; and each of recesses which are open toward the front surface and a rear surface and which store a gas therein, the recesses forming a plurality of hollows by expanding and drawing the plastic deformation film through discharging of the gas; and a gas-permeable material which is provided on the rear surface side of the inorganic material and into which the high-pressure gas is injected.

A substrate for hollow structural member production using a substrate can have a feature in that the gas-permeable material is provided with a supporting member on a surface opposite to the surface with which the inorganic material is provided, the supporting member being formed in a material which is higher in rigidity than the gas-permeable material, the supporting member having a through hole communicated with the gas-permeable material.

An apparatus for manufacturing a hollow structural member can have a feature in that it comprises; a hermetically sealed vessel defined, with the substrate for hollow structural member production according to claim 8 serving as a border, into an upper space which faces each of the recesses, and a lower space which faces the supporting member; a pump which is in communication with the upper space and which pressurizes and depressurizes the gas in the upper space; a discharge valve which is in communication with the upper space and which discharges the gas in the upper space; a pump which is in communication with the lower space and which pressurizes the gas pressure in the lower space; and a discharge valve which is in communication with the lower space and which discharges the gas in the lower space.

A method of manufacturing a hollow structural member can comprise controlling the pressure in the hermetically sealed vessel at the time of expansion and drawing of the plastic deformation material. Therefore, the dimensions of the hollow structural member can be controlled.

BEST MODE FOR CARRYING OUT THE INVENTION

Preferred embodiments of the method of manufacturing a hollow structural member, the substrate for hollow structural member production, and an apparatus for manufacturing a hollow structural member relating to the invention are explained with reference to the attached drawings.

(Embodiment)
(Construction of A Hollow Structural Member 1)

Figure 1:
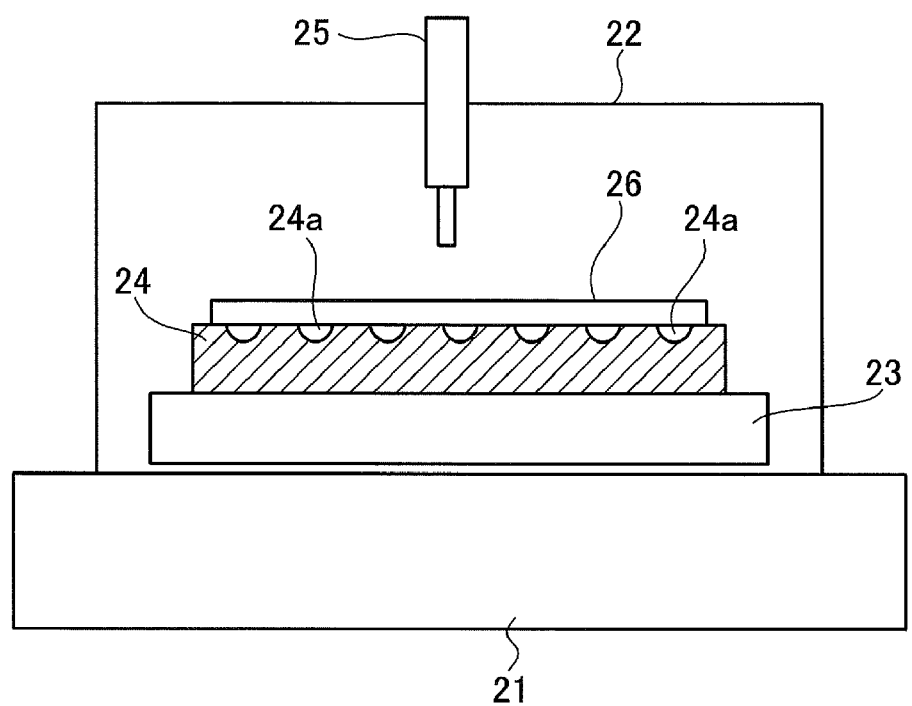
FIG. 1 is a general view showing an example of a conventional apparatus for manufacturing a hollow structural member.
Figure 2:
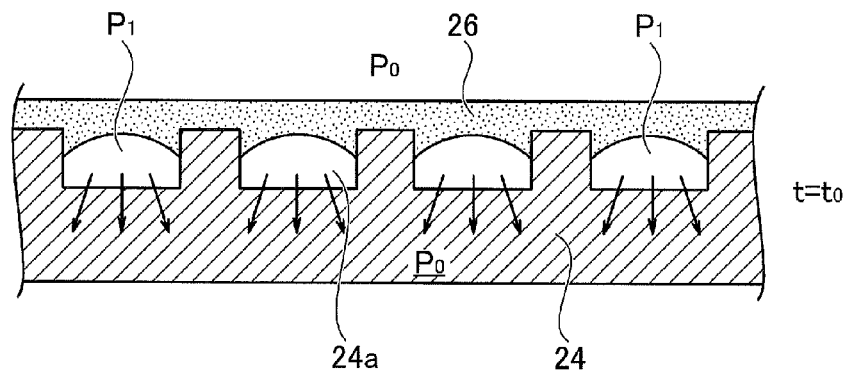
FIG. 2 is a partial sectional view showing a state in which a plastic deformation film has been formed on a surface of a substrate for hollow structural member production.
Figure 3:
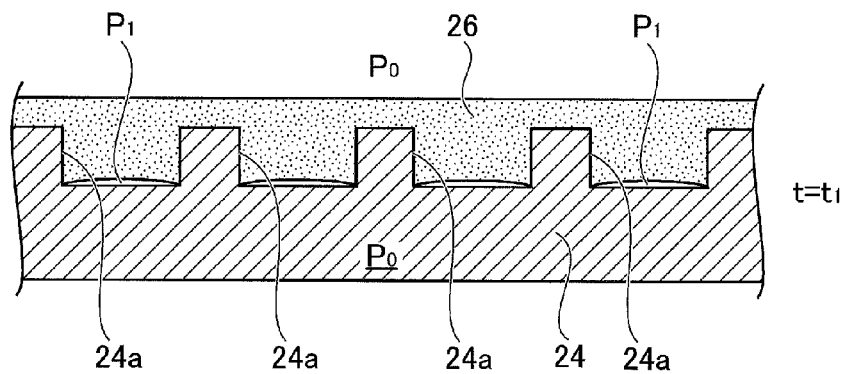
FIG. 3 is a partial sectional view showing a state in which air bubbles in each of recesses shown in FIG. 2 disappear.
Figure 4:
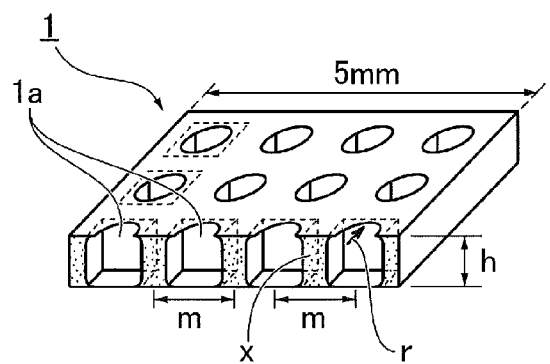
FIG. 4 is a sectional view showing an example of a hollow structural member to be manufactured by an apparatus for manufacturing a hollow structural member relating to Example 1.

FIG. 4 shows a honeycomb structural member as a hollow structural member 1 to be manufactured by the method of manufacturing a hollow structural member relating to the invention. This hollow structural member 1, here, is 10 μm in a pitch distance m between a hollow part 1a and an adjoining hollow part 1a, 15 μm in height h, about 5 μm on an average in radius r, 2 μm in thickness of a partition wall x, and 5 mm×5 mm in length and width of a recess-forming region. As a plastic deformation material for forming the plastic deformation film, aqueous solution of gelatin diluted to 30% is used. The method of manufacturing relating to the invention is applicable to the manufacturing of a hollow structural member having a pitch m of 1-100 μm and a height h of 1-300 μm.

EXAMPLE 1

Figure 5:
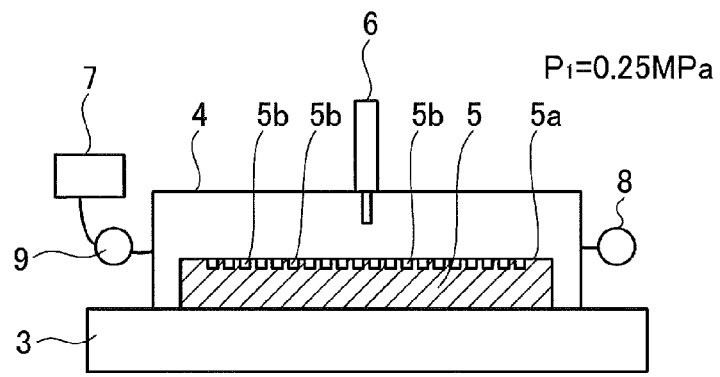
FIG. 5 is an explanation diagram showing an outline of an apparatus for manufacturing a hollow structural member.

FIG. 5 is a schematic view showing an example of an apparatus for manufacturing a hollow structural member relating to the invention. In FIG. 5, reference numeral 3 denotes a material coating apparatus. On an upper part of the material coating apparatus 3 there is provided a hermetically sealed vessel 4. Inside this hermetically sealed vessel 4 there is disposed a substrate 5 for hollow structural member production. On an upper part of the hermetically sealed vessel 4 there is provided a material ejection apparatus 6 which ejects the plastic deformation material. To this hermetically sealed vessel 4 there are connected a pressurizing-depressurizing pump 7 and a discharge valve 8. Between the pressurizing-depressurizing pump 7 and a discharge valve 8 there is disposed a pressure-regulating valve 9.

The substrate 5 for hollow structural member production has, on a side of the front surface 5a, each of the recesses 5b that store therein a gas for forming the hollow parts 1a. A gas-permeable material is used here as the substrate 5 for hollow structural member production. The gas-permeable material is constituted by a high polymer material such as silicone rubber (polydimethylsiloxane (PDS)), and the like, which is high in water repellency. The coefficient of gas permeability is, e.g., $3\times10^{-11}$ (cm$^3$·cm/(cm$^2$·s·Pa). The time of permeation of the gas is about 1.2 sec. when calculated based on a pressure difference of 0.4 MPa, a thickness of 0.1 cm, an area of 1 cm$^2$, and an amount of gas permeation of 0.0015 cm$^3$. Depending on circumstances, as the gas-permeable material, thermoplastic material such as polystyrene (PS), polycarbonate (PC), and the like may be used.

As the gas-permeable material, it is possible to use an inorganic material having cavities inside thereof. However, since the fluctuation of the coefficient of gas permeability is large, it is preferable to use high polymer materials which are smaller in fluctuation of the coefficient of gas permeability in manufacturing a hollow structural member 1 as a precision-shaped part having minute cavities.

Now, a description will be mad of the method of manufacturing the hollow structural member 1.

First, by controlling the pressurizing-depressurizing pump 7 on condition that the initial value $P_0$ of the inner gas pressure in the hermetically sealed vessel 4 is 0.1 MPa, the gas pressure P1 is set to a high-pressure conditions of 0.25 MPa as shown in FIG. 5. The gas pressure $P_1$ inside the hermetically sealed vessel 4 is maintained for about 10 minutes to the high-pressure conditions. The amount of gas corresponding to the gas pressure P1 is caused to be penetrated into the substrate 5 for hollow structural member production, and the gas is encapsulated (contained or sealed) in the substrate 5 for hollow structural member production.

Figure 6:
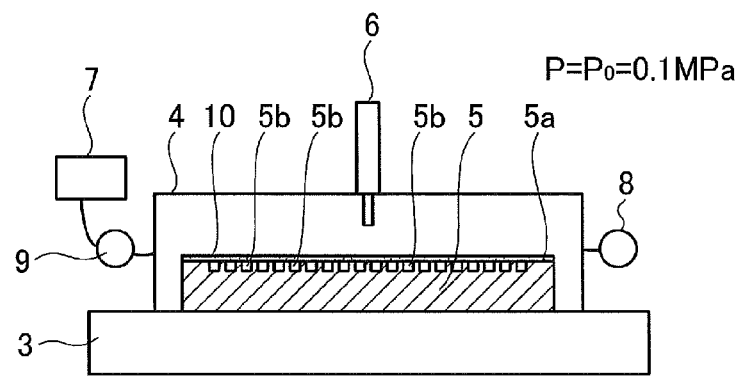
FIG. 6 is an explanation diagram showing a state in which a deformation film is formed on a substrate for hollow structural member production of an apparatus for manufacturing a hollow structural member relating to Example 1.

Then, as shown in FIG. 6, the gas inside the hermetically sealed vessel 4 is discharged to the outside by the discharge valve 8 to thereby return the gas pressure inside the hermetically sealed vessel 4 to the initial value $P_0$ ($P_0$0.1 MPa). A plastic deformation material is ejected out of the material ejection apparatus 6 and, by using the material coating apparatus 3, a plastic deformation film 10 is formed on the surface 5a. The gelling temperature of an aqueous solution of gelatin as the plastic deformation material is 38° C.-45° C. In this Example the aqueous solution of gelatin at 60° C., i.e., a temperature above the gelling temperature, was ejected through the material ejection apparatus 6 to the surface 5a of the substrate 5 for hollow structural member production. In addition, the plastic deformation film 10 of 10 μm thick was formed by a spin coating method. It is to be noted that the formation of the plastic deformation film 10 need not be by the spin coating method, but may rely on a slit coating method, dye coating method, curtain coating method, soap film method, and the like.

Figure 7:
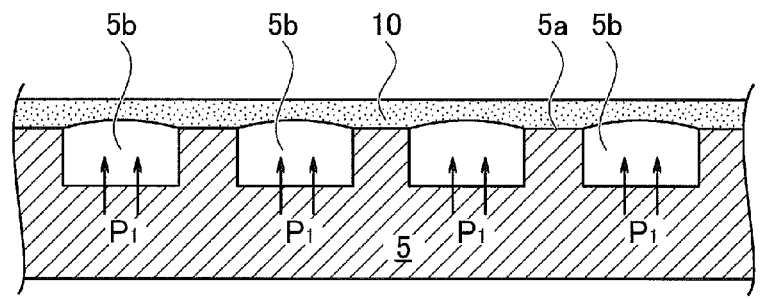
FIG. 7 is a partial enlarged view showing the foaming process of the substrate for hollow structural member production relating to Example 1.
Figure 8:
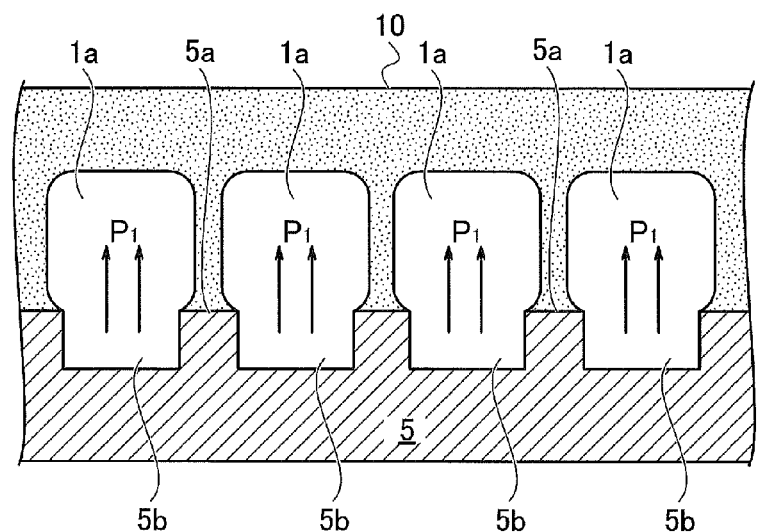
FIG. 8 is a partial enlarged view showing a state in which the plastic deformation film is expanded and stretched.

Substantially at the same time as the formation of the plastic deformation film 10, the gas having the gas pressure of P1 encapsulated in the substrate 5 for hollow structural member production, as shown in enlargement in FIG. 7, is discharged to the gas storing space of each of the recesses 5b and, as shown in FIG. 8, the plastic deformation film 10 is expanded and drawn. In addition, since the amount of gas encapsulated in the substrate 5 for hollow structural member production decreases with a lapse of time, the sealing gas pressure in the substrate 5 for hollow structural member production also decreases, whereby a hollow structural member 1 having hollows 1a is formed. By the way, there is a physical characteristic in that, since the liquid in the form of the aqueous solution of gelatin is interposed in the space between the surface 5a which lies between a recess 5b and an adjoining recess 5b, and the plastic deformation film 10, the gas encapsulated in the substrate 5 for hollow structural member production will not be released from the surface 5a that lies in the space between a recess 5b and an adjoining recess 5b.

Then, the inside of the hermetically sealed vessel 4 is set to a low-humidity atmosphere to thereby dry the hollow structural member 1. In the Example, drying is made for about five minutes under conditions of internal temperature of the hermetically sealed vessel 4 of 24° C. and humidity of 45 wt %. In order to accelerate the drying of the hollow structural member 1, it is preferable to set the inside of the hermetically sealed vessel 4 to a high temperature and low humidity. By using a microwave heater means as the heating means (not illustrated), it is possible to further accelerate the drying speed. As a result, the drying speed can be made to less than 20 seconds.

Next, the hollow structural member 1 is manually peeled off from the substrate 5 for hollow structural member production. Since silicone rubber which is superior in water repellency is used as the gas-permeable material in the substrate 5 for hollow structural member production, peeling is easy.

Figure 9:
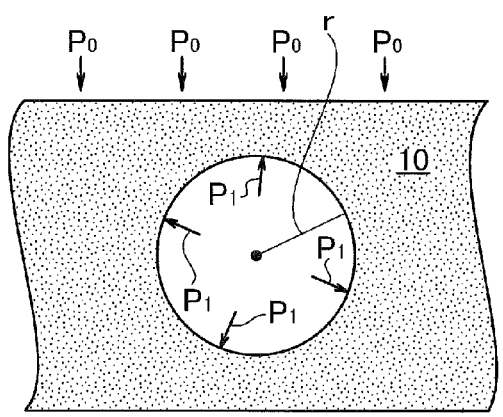
FIG. 9 is an explanation diagram explaining the Yung-Laplace's equation.

Here, according to Yung-Laplace's equation, as shown in FIG. 9, let the pressure in the gas storing space in the recess 5b be $P_1$, the surface tension of the plastic deformation material which is formed into the plastic deformation film 10 be σ, the average radius of the bubbles (supposed to be spherical) in the gas storing space be r, and the pressure of the plastic deformation material (the same as the internal pressure of the hermetically sealed vessel 4) be $P_0$. Then we have $$\Delta P = P_1 - P_0 = 2\sigma/r$$

When the value 0.073 (N/m) which is the surface tension of water is substituted for σ, and the radius 5 μm is substituted for r, then ΔP will be about 0.03 MPa. Let $P_0$ be 0.1 MPa, and the pressure $P_0$ of the gas to be encapsulated in the substrate 5 for hollow structural member production must be above 0.13 MPa.

Then, hollow structural members 1 were manufactured on trial by using the apparatus for manufacturing the hollow structural member, as similarly shown in FIG. 5, under various conditions of gas pressure $P_1$ in the hermetically sealed vessel 4 starting with 0.13 MPa. As a result, the hollow parts 1a of the hollow structural member 1 were formed without damages thereto when the gas pressure $P_1$ was above 0.13 MPa and below 0.4 MPa. When the gas pressure $P_1$ was below 0.13 MPa, either the hollows were irregular or not formed at all. When the gas pressure $P_1$ exceeded 0.4 MPa, some hollow structural members 1 were found with partly damaged hollows 1a. When the gas pressure $P_1$ was at 0.25 MPa, acceptable hollow structural members 1 were obtained whose hollows 1a were uniform in size.

Figure 10:
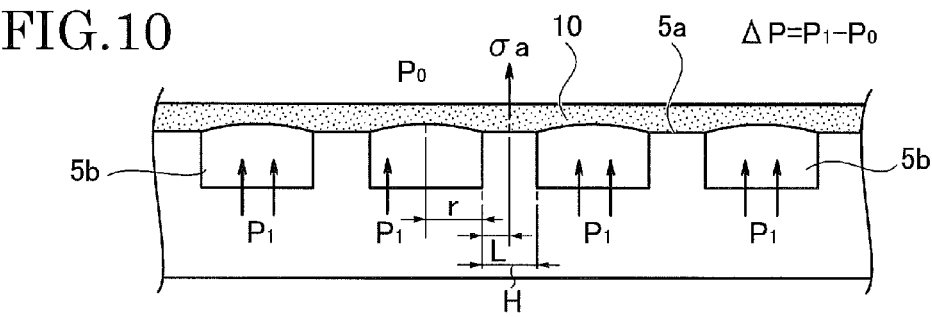
FIG. 10 is an explanation diagram explaining the relationship between the tensile stress and the tensile strength.

As shown in enlargement in FIG. 10, let the tensile stress right after the expansion and drawing of the plastic deformation material that forms the plastic deformation film 10 be $\sigma_a$, the pressure difference be $\Delta P$, the average radius of the recesses be 5b, and one-half of the distance on surface 5a between a recess 5b and an adjoining recess 5b (distance among recesses) be L. Then we have the tensile stress $$\sigma_a = \Delta P \cdot r / 2L$$

Let the diameter d of the recess 5b be 10 μm, and the pitch m between a recess 5b and an adjoining recess 5b be 10 μm. Then we have L=2.5 μm. For example, let the pressure difference $\Delta P$ be 0.15 Ma, 0.3 MPa and 0.5 MPa, the tensile stress $\sigma_a$ will be $\sigma_a$ (at the time of 0.15 Ma)=75 KPa, $\sigma_a$ (at the time of 0.3 MPa)=150 KPa and $\sigma_a$ (at the time of 0.5 MPa) =250 KPa, respectively. The tensile stress on of aqueous solution of 30% in dilution which is the plastic deformation material is about 150 KPa. It is difficult to obtain an accurate value of this tensile strength on since it varies from time to time due to evaporation of water molecules which constitute the gelatin aqueous solution. In addition, the higher the dilution concentration of the gelatin aqueous solution, the larger the tensile strength $\sigma_b$.

When the pressure difference $\Delta P$ is between 0.15 Pa and 0.4 MPa, the tensile stress $\sigma_a$ is smaller than the tensile strength $\sigma_b$, it is considered to be that the hollow structural member 1 having the hollow part 1a can be formed without being damaged. When the pressure difference $\Delta P$ is above 0.4 MPa, the tensile stress $\sigma_a$ is larger than the tensile strength $\sigma_b$, it is considered to be that the plastic deformation material is damaged and therefore that the hollow structural member 1 having the hollow part 1a cannot be formed.

Therefore, it is considered that the pressure difference $\Delta P$ must fall within the range expressed by $(2L\sigma_a/r) < (2L\sigma_b/r)$ In summary, the method of manufacturing the hollow structural member 1 of this Example 1 is generally made up of the steps of: injection of pressurizing gas into the substrate 5 for hollow structural member production; formation of the plastic deformation film by coating the surface 5a of the substrate 5 for hollow structural member production with the plastic deformation material; foaming at substantially the same time as the formation of the plastic deformation film 10; drying; and peeling.

EXAMPLE 2

Figure 11:
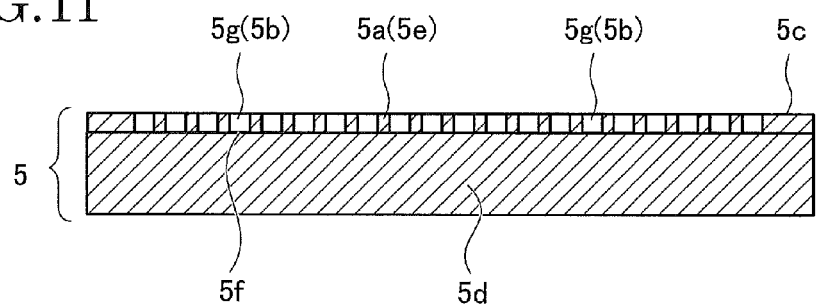
FIG. 11 is a sectional view of the substrate for hollow structural member production relating to Example 2.

In this Example 2, the substrate 5 for hollow structural member production is constituted, as shown in FIG. 11, by an inorganic material 5c and a gas-permeable material 5d. The inorganic material 5c has: a surface 5e in which the plastic deformation film 10 is formed by using the plastic deformation material; and through holes 5g which are open toward the surface 5e and toward a rear surface 5f on the opposite side and which constitute respective recesses 5b for storing therein a gas that is used for forming a plurality of hollows 1a by expanding and drawing the plastic deformation film 10 through discharging of the gas. As this inorganic material 5c cupper foil (metal) is used in this Example. The gas-permeable material (silicone rubber in this Example) 5d is disposed on the side of the rear surface 5f of the inorganic material 5c.

This substrate 5 for hollow structural member production is formed by coating the cupper foil with uncured silicone, and thereafter by curing the uncured silicone. Thereafter, the cupper foil is formed with a pattern of a hexagonal through hole 5g which corresponds to each of the recesses 5b, and is then processed by etching, to thereby form a through hole 5g. According to the above processing, the recesses 5b of the substrate 5 for hollow structural member production can be easily formed.

In case a multiplicity of projections and recesses are formed on silicone rubber, it is necessary to transfer them by using a mould having projections and recesses. When overhang and the like in each of the recesses of the mould contour, and the compatibility between the silicone rubber and the mould material are large, there is danger that the silicone rubber is damaged at the time of peeling the silicone rubber from the mould, thereby resulting in poor transferring. In this Example 2 such danger can be avoided.

Further, in case surface treatment is performed on the surface 5a and recesses 5b of the substrate 5 for hollow structural member production, silicone rubber having a chemically stable interface offers a difficulty in the surface treatment. The inorganic material 5c, on the other hand, is easy in surface treatment. Particularly, if the adhesive force of the plastic deformation material to the surface 5a of the substrate 5 for hollow structural member production is insufficient, particularly at the time of expansion and drawing of the plastic deformation material, there is a possibility that the plastic deformation material is peeled off from the surface 5a during the expansion and drawing. On the other hand, if the adhesive force of the surface 5a of the substrate 5 for hollow structural member production is too large, there is a possibility that the hollow structural member 1 is damaged at the time of peeling the hollow structural member 1 off from the substrate 5 for hollow structural member production. It is difficult to adjust the adhesive force with the silicone rubber alone. However, by making the substrate 5 for hollow structural member production into a composite constitution of the inorganic material 5c and the gas-permeable material 5d, the adjustment of the adhesive force can be simplified.

EXAMPLE 3

In the method of manufacturing the hollow structural member relating to Example 1, there are performed the processes of manufacturing the hollow structural member in which: the substrate 5 for hollow structural member production 1 is set in position inside the hermetically sealed vessel 4; high-pressure gas is caused to be penetrated into the substrate 5 for hollow structural member production under high-pressure gas conditions inside the hermetically sealed vessel 4; thereafter, the substrate 5 for hollow structural member production is coated on its surface with the plastic deformation material, and is foamed; and the plastic deformation material is expanded and drawn. Therefore, some time is required to reduce the pressure inside the hermetically sealed vessel 4 and the pressure of the gas injected into the substrate 5 for hollow structural member production will be lowered.

In Example 3, there is provided a substrate 5 for hollow structural member production in which the gas injected into the inside of the substrate 5 for hollow structural member production can be prevented from getting lowered and in which the efficiency of manufacturing the hollow structural member can be improved.

Figure 12A:
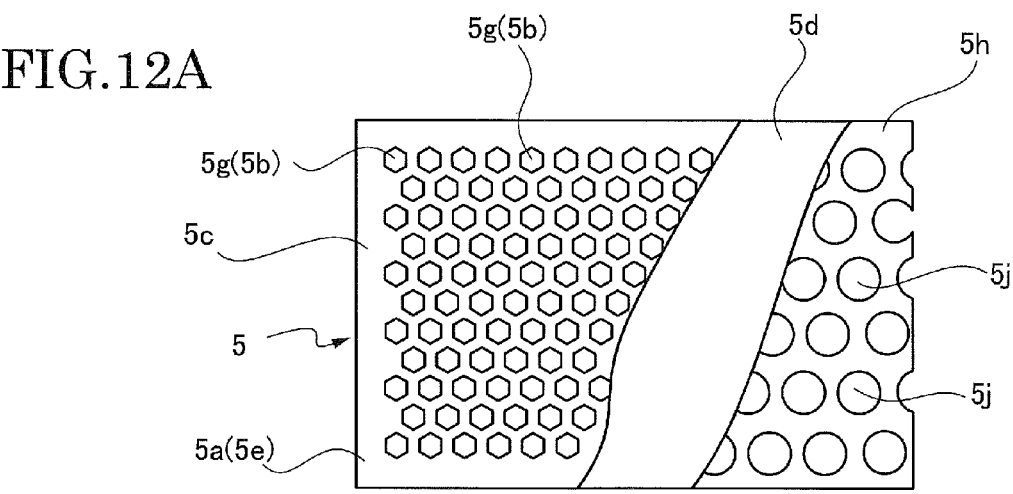
FIG. 12A is a plan view, partly shown in section, of the substrate for hollow structural member production relating to Example 3
Figure 12B:
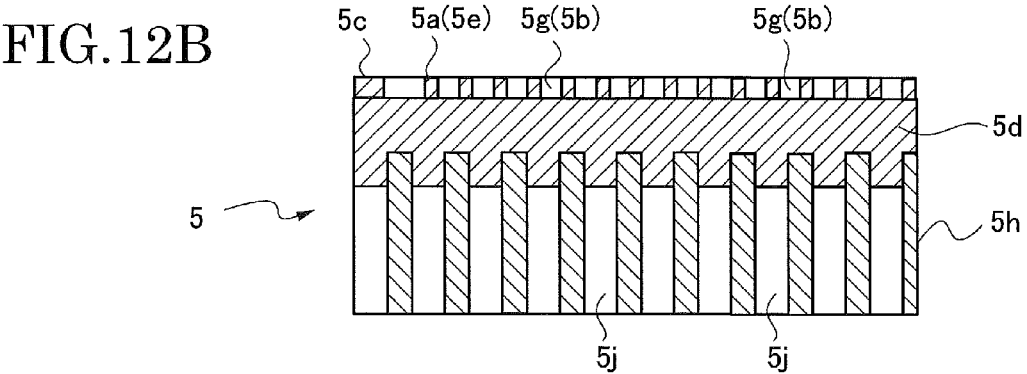
FIG. 12B is a sectional view thereof.

The substrate 5 for hollow structural member production is constituted, as shown in FIGS. 12A and 12B, by an inorganic material 5c, a gas-permeable material 5d, and a supporting member 5h. Since the constitution of the inorganic material 5c and the gas-permeable material 5d are the same as those in Example 2, the detailed description thereof will be omitted. The supporting member 5h is disposed on a surface on the side of the gas-permeable material 5d which is opposite to the inorganic material 5c. The supporting member 5h is formed of a material having a rigidity higher than the gas-permeable material 5d and has through holes 5j which are in communication with the gas-permeable material 5d. The through holes 5j have a role of supplying the gas to the gas-permeable material 5d. The supporting member 5h can be obtained by, e.g., punching with a pressing means a steel plate of 5 mm thick to obtain holes of each opening diameter of 5 mm. The reason why the supporting member 5h is disposed on the gas-permeable material 5d is to prevent the gas-permeable material 5d from being deformed or from being damaged due to the pressure difference $\Delta P'$ which is described hereinafter.

Figure 13:
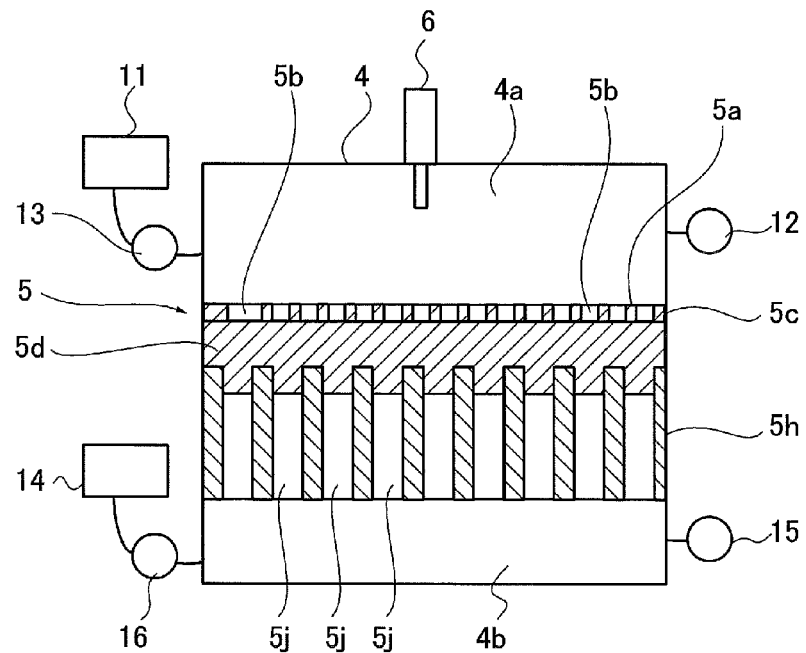
FIG. 13 is a sectional view showing an outline of the apparatus for manufacturing a hollow structural member relating to Example 3, and shows the state before forming the plastic deformation film.

Next, as shown in FIG. 13, this substrate 5 for manufacturing hollow structural member is formed by: coating the surface of the supporting member 5h with uncured silicone rubber; placing copper foil on the silicone rubber; and thereafter curing the uncured silicone rubber, thereby forming the substrate 5 by joining.

In a manner in which the side surface of the substrate 5 for manufacturing hollow structural member is in close contact with the hermetically sealed vessel 4, the substrate 5 for manufacturing hollow structural member is set in position inside the hermetically sealed vessel 4. According to this arrangement, the inside of the hermetically sealed vessel 4 is defined, with the substrate 5 for manufacturing hollow structural member serving as a border, into an upper space 4a to which each of the recesses 5 faces, and a lower space 4b to which the supporting member 5h faces. The upper space 4a of the hermetically sealed vessel 4 is in communication with: a pump 11 which pressurizes-depressurizes the gas pressure in the upper space 4a; and a discharge valve 12 which discharges the gas in the upper space 4a. A pressure-regulating valve 13 is provided between the pump 11 and the hermetically sealed vessel 4.

The lower space 4b of the hermetically sealed vessel 4 is in communication with: a pump 14 which pressurizes the gas pressure in the lower space 4b; and a discharge valve 15 which discharges the gas in the lower space 4b. A pressure-regulating valve 16 is provided between the pump 11 and the hermetically sealed vessel 4.

In Example 3, the high-pressure gas (gas pressure of 0.25 MPa) is injected from the side of the lower space 4b to the gas-permeable material 5d. The gas pressure in the upper space 4a is acceptable if it is lower than the gas pressure of the high-pressure gas. It is, however, set to ambient pressure conditions from the viewpoint of workability in coating the inorganic material 5c of the substrate 5 for manufacturing hollow structural member with plastic deformation material.

Figure 14:
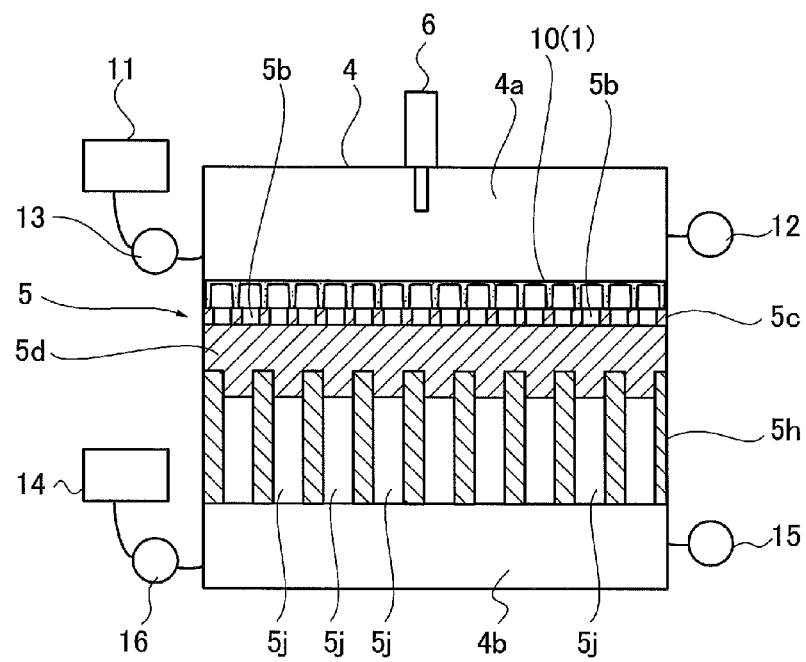
FIG. 14 is a sectional view showing an outline of the apparatus for manufacturing a hollow structural member relating to Example 3, and shows the state in which the plastic deformation film is being expanded and drawn.

The time of injecting the high-pressure gas into the gas-permeable material 5d may be appropriately set. In this Example, as shown in FIG. 14, about 10 minutes after the starting of injection of the high-pressure gas into the lower space 4b, the plastic deformation material is coated on the surface 5e of the inorganic material 5c, to thereby form a plastic deformation film 10. At substantially the same time as the formation of this plastic deformation film 10, the high-pressure gas is released from each of the recesses 5b, to thereby start the foaming. According to this arrangement, the plastic deformation material is expanded and drawn. Then, under the same low-humidity and low-temperature atmosphere as in the Example 1, the plastic deformation material is dried. Here, drying was performed at ambient conditions of a temperature of 24° C. and a humidity of 45 wt % for about five minutes. According to this arrangement, the hollow structural member 1 is manufactured.

In case the height (thickness) of the hollow structural member 1 is controlled, the gas pressure in the upper space 4a is adjusted from the time right before starting the foaming of the plastic deformation material. If the pressure difference between the gas pressure in the upper space 4a and the gas pressure in the lower space 4b is made large, the penetration of the plastic deformation material into each of the recesses is further blocked. Once the plastic deformation material has been foamed, even if the gas pressure inside the upper space 4a is made high, the plastic deformation material will not be penetrated into each of the recesses. On the other hand, by controlling the pressure in the upper space 4a to a high pressure, the speed of foaming is kept under control and the height (thickness) of the hollow structural member 1 can be controlled. In order to shorten the time for drying, it is preferable to set the inside of the hermetically sealed vessel 4 to a still lower humidity and higher temperature.

Figure 15:
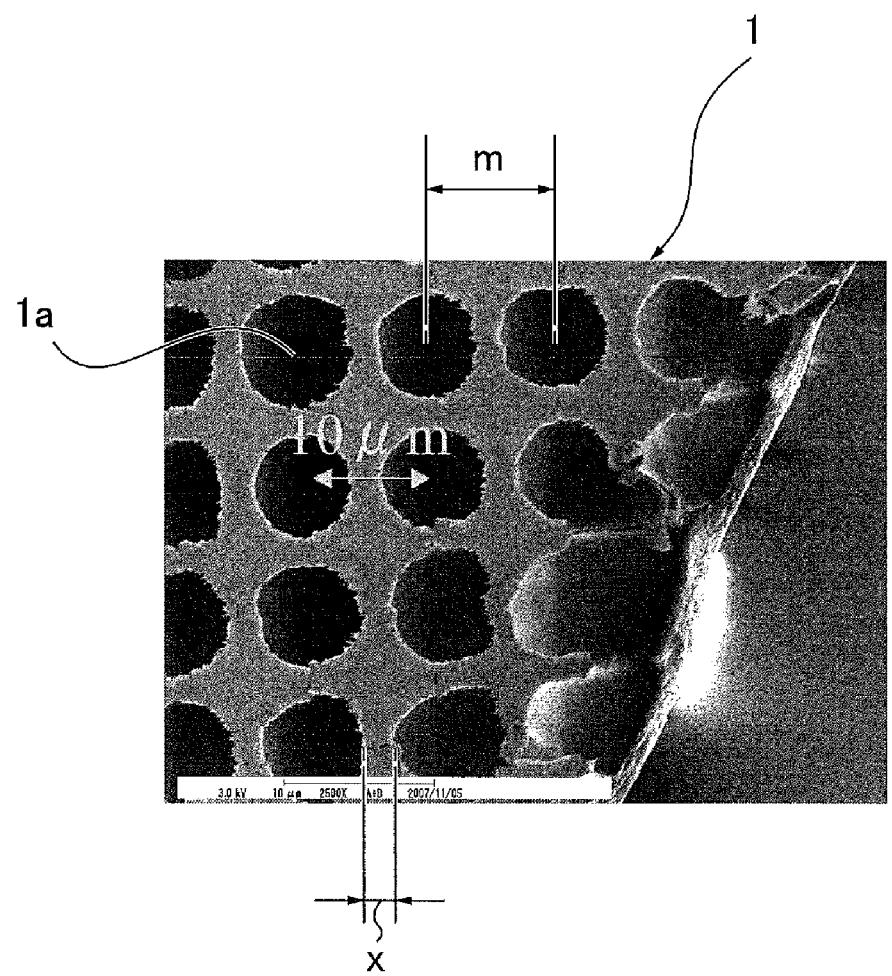
FIG. 15 is a picture by an electron microscope showing an example of a hollow structural member obtained by the manufacturing method relating to Example 3.

FIG. 15 is a photograph showing the hollow structural member 1 manufactured in this manner. The distance between the center of the hollows 1a and the center of the hollows 1a of the hollow structural member (i.e., pitch m) was about 10 μm, and the thickness x of the partition wall to partition a hollow 1a and another hollow 1a was 0.2 μm, and the height h was about 10 μm.

In these Examples the aqueous solution material was used in description as the plastic deformation material. It need not be limited to the above Examples, but as the plastic deformation material, a UV cured resin, thermoplastic resin, and the like may also be used.

According to the invention described in claim 1, by using a gas-permeable material in part of a material that constitutes the substrate for hollow structural member production, a high-pressure gas is encapsulated by injection in advance, under high-pressure conditions, into the gas-permeable material. The plastic deformation film is formed on the surface by expanding and drawing the plastic deformation film under reduced-pressure conditions and, while preventing the plastic deformation material from entering the recesses, the high-pressure gas that is encapsulated in the gas-permeable material is discharged into each of the recesses. Therefore, there is an effect in that a hollow structural member having a pitch space among the hollows of below 30 μm can be precisely manufactured.

According to the invention described in claim 2, the formation of the plastic deformation film on the surface of the substrate for hollow structural member production can be performed substantially at the same time as the injection of the gas into the gas-permeable material that constitutes part of the substrate for hollow structural member production. Therefore, there is an effect in that the manufacturing time can be shortened.

According to the invention described in claim 3, there is an effect in that, at the time of expansion and drawing of the plastic deformation material that constitutes the plastic deformation film, a hollow structural member can be manufactured without the plastic deformation material's being damaged.

According to the invention described in claim 4, there is an effect in that the fluctuations in pressure of the gas to be discharged from each of the recesses toward the plastic deformation film can be reduced and, therefore, that the dimensional accuracy of the hollow structural member can further be improved. In addition, there is also an effect in that the manufacturing time of the hollow structural member can be shortened.

According to the invention described in claim 5, since the gas-permeable material is formed by using a high polymer material, there is an effect in that the product is structurally stable, is small in fluctuation in gas permeability coefficient, and can discharge the gas of uniform pressure out of the respective recesses.

According to the invention described in claim 6, since dimethylpolysiloxane (DMPS) is used as the high polymer material, there is an effect in that the time of penetration of the gas into the gas-permeable material can be shortened. In addition, there is a further effect in that the time of manufacturing the hollow structural member can be shortened and that the hollow structural member can be supplied at a reduced cost.

According to the invention described in claim 7, since there are employed the material to form each of the recesses and the gas-permeable material that are different from that used in claim 1, in addition to the effect of claim 1, there is further effect in that the freedom in the choice of material to form the recesses increases. For example, there can be selected a material that is easy in patterning processing or a material that is easy in surface treatment.

According to the invention described in claim 8, since the gas-permeable material is supported by a supporting member that has a high rigidity, there is an effect in that the gas-permeable material can be prevented from being deformed.

According to the invention described in claim 9, while injecting the gas into the gas-permeable material from the surface that is opposite to the surface having each of the recesses, the plastic deformation film can be formed on the surface of each of the recesses. Therefore, like the invention as described in claims 2 and 3, there is an effect in that the time for manufacturing can be shortened.

According to the invention described in claim 10, since the pressure in the hermetically sealed vessel can be adjusted at the time of expansion and drawing of the plastic deformation film, the hollow structural member can be controlled in its dimension.

DESCRIPTION OF REFERENCE NUMERALS

5 ... Substrate for hollow structural member production
5a ... front surface
5b ... recess
10 ... plastic deformation film

The invention claimed is:

1. A method of manufacturing a hollow structural member using a substrate for hollow structural member production, in which the substrate has a surface on which a plastic deformation film is formed, and a plurality of recesses which open toward the surface and which store therein a gas for forming a plurality of hollows by expanding and drawing the plastic deformation film through discharging of the gas, the method comprising:
(a) using a gas-permeable material in part of a material that constitutes the substrate for hollow structural member production;
(b) encapsulating a high-pressure gas by injection in advance, under high-pressure conditions, into the gas-permeable material;
(c) forming the plastic deformation film on the surface under reduced-pressure conditions; and
(d) manufacturing the hollow structural member, while preventing the plastic deformation material from entering the recesses, by discharging the high-pressure gas that is encapsulated in the gas-permeable material into each of the recesses so that the plastic deformation film is expanded and drawn by the high-pressure gas into each of the recesses,
wherein the high-pressure gas is injected into the gas-permeable material in (b) from a place other than the surface.

2. The method of manufacturing a hollow structural member according to claim 1, wherein the pressure difference $\Delta P$ between the gas pressure of the high-pressure gas and the gas pressure under reduced-pressure conditions satisfies the following conditional expression:

$$(2\times\sigma/r)<\Delta P<2\times\sigma_b \cdot L/r$$

where $\sigma$ is a surface tension of the plastic deformation material, r is an average radius of each of the recesses, $\sigma_b$ is a tension strength of the plastic deformation material, and L is the distances among the recesses.

3. The method of manufacturing a hollow structural member according to claim 1, wherein the gas-permeable material consists essentially of a high polymer material.

4. The method of manufacturing a hollow structural member according to claim 3, wherein the high polymer material is dimethylpolysiloxane (DMPS).

5. A method of manufacturing a hollow structural member using a substrate for hollow structural member production, in which the substrate has a surface on which a plastic deformation film is formed, and a plurality of recesses which open toward the surface and which store therein a gas for forming a plurality of hollows by expanding and drawing the plastic deformation film through discharging of the gas, the method comprising:
(a) using a gas-permeable material in part of a material that constitutes the substrate for hollow structural member production;
(b) encapsulating a high-pressure gas by injection in advance, under high-pressure conditions, into the gas-permeable material;
(c) forming the plastic deformation film on the surface under reduced-pressure conditions; and
(d) manufacturing the hollow structural member, while preventing the plastic deformation material from entering the recesses, by discharging the high-pressure gas that is encapsulated in the gas-permeable material into each of the recesses so that the plastic deformation film is expanded and drawn by the high-pressure gas into each of the recesses,
wherein the high-pressure gas is injected into the gas-permeable material in (b) from a rear-surface side which is opposite to said surface.

6. A substrate for manufacturing a hollow structural member using a plastic deformation material, in which the substrate has: a surface on which a plastic deformation film is formed, and a plurality of recesses which open toward the surface and which store therein a gas for forming a plurality of hollows by expanding and drawing the plastic deformation film through discharging of the gas, the substrate comprising:
an inorganic material for constituting: a front surface in which a plastic deformation film is formed by using a plastic deformation material; and each of recesses which are open toward the front surface and a rear surface and which store a gas therein, the recesses forming a plurality of hollows by expanding and drawing the plastic deformation film through discharging of the gas; and a gas-permeable material which is provided on the rear surface side of the inorganic material and into which the high-pressure gas is injected, the gas-permeable material being configured for the high-pressure gas to be injected into the gas-permeable material from a place other than the surface.

7. A substrate for manufacturing a hollow structural member using a substrate according to claim 6, wherein the gas-permeable material is provided with a supporting member on a surface opposite to the surface with which the inorganic material is provided, the supporting member being formed in a material which is higher in rigidity than the gas-permeable material, the supporting member having a through hole communicated with the gas-permeable material.

8. An apparatus for manufacturing a hollow structural member, comprising:

a hermetically sealed vessel defined, with the substrate for hollow structural member production according to claim 7 serving as a border, into an upper space which faces each of the recesses, and a lower space which faces the supporting member;

a pump which is in communication with the upper space and which pressurizes and depressurizes the gas in the upper space;

a discharge valve which is in communication with the upper space and which discharges the gas in the upper space;

a pump which is in communication with the lower space and which pressurizes the gas pressure in the lower space; and a discharge valve which is in communication with the lower space and which discharges the gas in the lower space.

9. A method of manufacturing a hollow structural member comprising controlling the height, with the apparatus for manufacturing a hollow according to clam 8, of the hollow structural member by controlling the gas pressure at least in the upper space at the time of expansion and drawing of the plastic deformation material.

10. The apparatus of claim 8, wherein the pump injects the high-pressure gas into the gas-permeable material in (b) from the rear-surface side.

* * * * *